United States Patent
Novin et al.

[11] Patent Number: 6,141,831
[45] Date of Patent: Nov. 7, 2000

[54] BISTABLE HINGE MECHANISM

[75] Inventors: Eugene Novin, Ambler; David A. Lowry, Wayne, both of Pa.

[73] Assignee: CEMA Technologies, Inc., Bridgeport, Pa.

[21] Appl. No.: 09/207,544

[22] Filed: Dec. 8, 1998

Related U.S. Application Data

[60] Provisional application No. 60/097,989, Dec. 9, 1997.

[51] Int. Cl.[7] ...................................................... E05F 1/08
[52] U.S. Cl. ................................. 16/330; 16/303; 16/331; 16/334; 379/433
[58] Field of Search ........................... 16/303, 330, 329, 16/331, 334, 254, 256, 271, 272

[56] References Cited

U.S. PATENT DOCUMENTS

| | | |
|---|---|---|
| 571,133 | 11/1896 | Hoffman . |
| 3,401,422 | 9/1968 | Ventura . |
| 3,975,794 | 8/1976 | Kaiser et al. . |
| 5,111,503 | 5/1992 | Takagi . |
| 5,138,743 | 8/1992 | Hoffman . |
| 5,257,310 | 10/1993 | Takagi et al. . |
| 5,600,868 | 2/1997 | Tourville et al. . |
| 5,628,089 | 5/1997 | Wilcox et al. . |
| 5,629,979 | 5/1997 | Domoleczny . |
| 5,682,644 | 11/1997 | Bohacik et al. . |
| 5,697,124 | 12/1997 | Jung . |
| 5,715,576 | 2/1998 | Liu . |
| 5,724,683 | 3/1998 | Sorimachi et al. . |
| 5,848,152 | 12/1998 | Slipy et al. ............................ 379/433 |
| 5,923,751 | 7/1999 | Ohtsuka et al. ....................... 379/433 |
| 5,937,062 | 8/1999 | Sun et al. .............................. 379/433 |

*Primary Examiner*—Anthony Knight
*Assistant Examiner*—Mark Williams
*Attorney, Agent, or Firm*—Akin, Gump, Strauss, Hauer & Feld, L.L.P.

[57] ABSTRACT

A hinge adapted to pivotably connect a hinged member to a device housing is provided. The hinge is adapted to maintain the hinged member in one of an open position and a closed position relative to the device housing. The hinge includes a first hinge part having an axis and a cam follower. The first hinge part is adapted to be connected to one of the hinged member and the device housing. A second hinge part is provided which is aligned with and rotatable about the axis of the first hinge part. The second hinge part has a cam surface. The cam follower on the first hinge part contacts the cam surface. The cam surface has a first position and a second position. The second hinge part is adapted to be connected to the other of the hinged member and the device housing. A spring is provided which urges the cam follower against the cam surface with a spring force. The first and second hinge parts each have an axial bore defined therethrough. An axial load bearing connector extends through the axial bores to connect first and second hinge parts such that forces generated by the spring are reacted in the axial load bearing connector. The hinge is adapted to hold the hinged member in an open position relative to the device housing when the cam follower is in the first position.

16 Claims, 4 Drawing Sheets

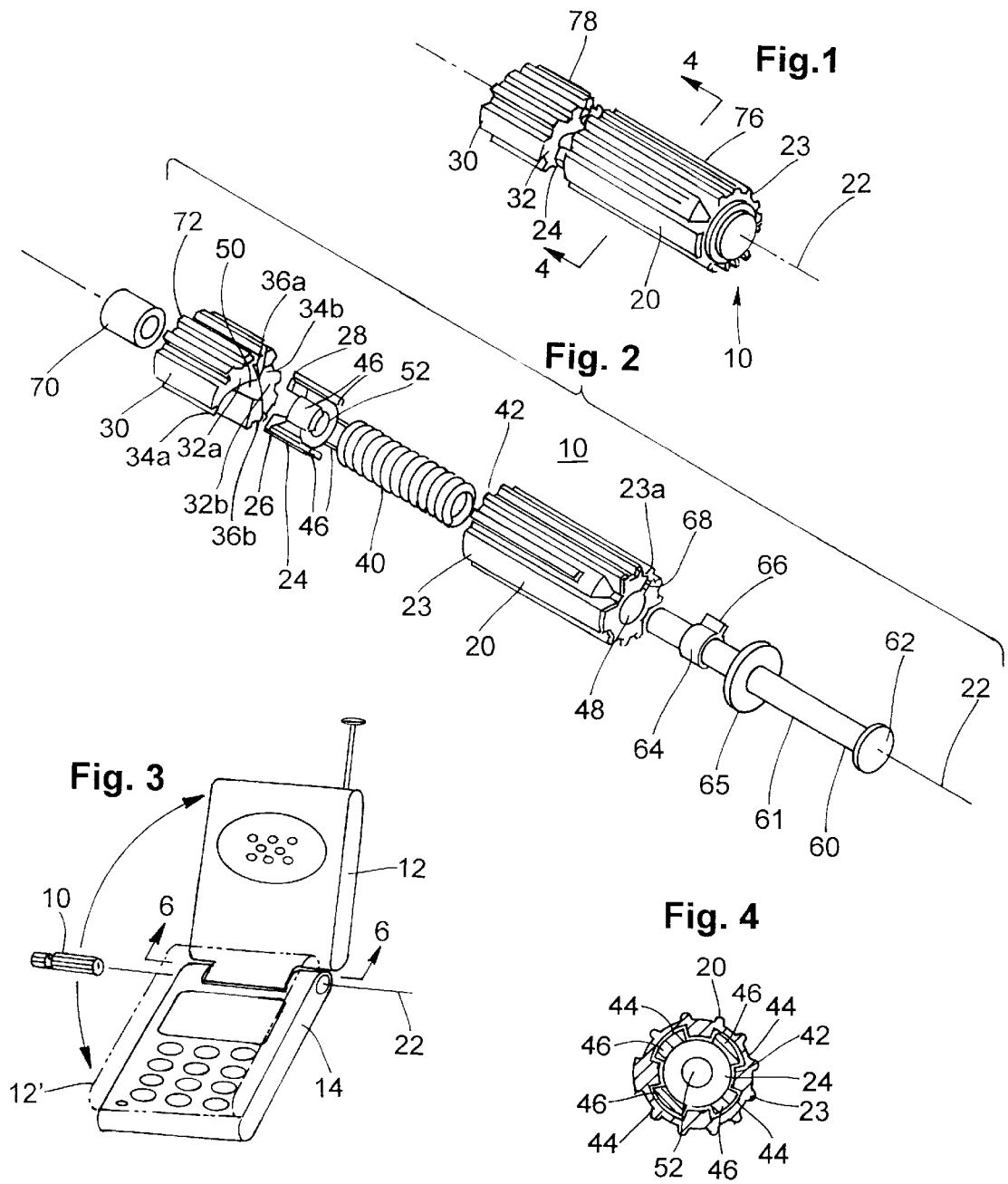

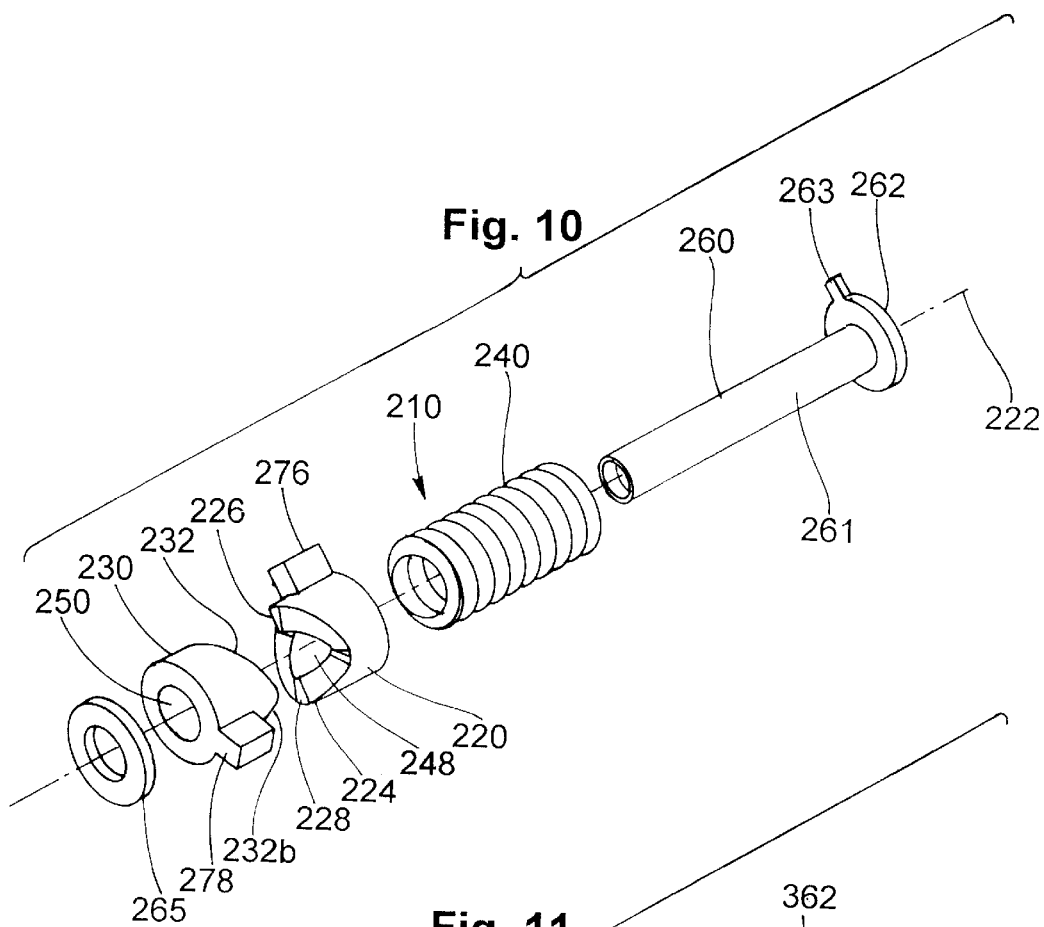
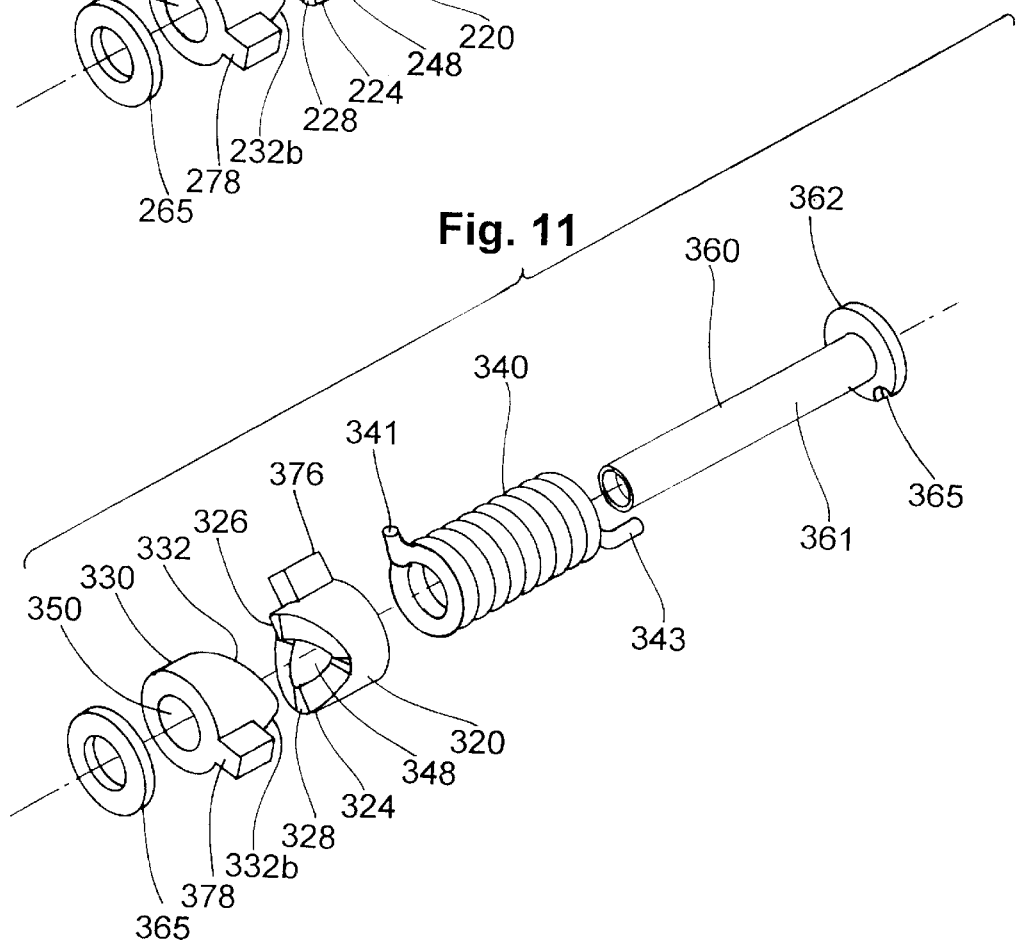

BISTABLE HINGE MECHANISM

CROSS-REFERENCE TO RELATED APPLICATIONS

This application claims the benefit of U.S. Provisional Application Ser. No. 60/067,989, filed Dec. 9, 1997.

BACKGROUND OF THE INVENTION

The present invention relates to a hinge assembly for rotatably coupling a hinged member to a device housing, and more particularly, to a position holding, self-latching hinge for holding a hinged member in one of an open position and a closed position relative to a device housing.

In certain hinge applications, it is desirable to provide a hinge which can maintain a hinged member in an open position or a closed position. When the hinged member is in the open position, in certain applications, such as portable communication devices (e.g., cellular and PCS phones) and in particular in clam shell style phones, it is desirable that the hinged member be held stably in position. It is also desirable in such applications that the hinge maintain the hinged member in a closed position relative to the device housing for storage and transport. Generally in such applications, the open position is set at a fixed, predetermined angle.

In the known devices, generally a spring bias member is installed between the hinged member and the device housing which biases the hinged element to the open position after an initial latching force is manually overcome or after a separate manual latch is released. However, the known hinge assemblies are provided in multiple pieces which are assembled in situ with the hinged member and the device housing. This type of known hinge imparts an axial force on the device housing and the hinged member and is costly to produce. While this additional loading can be accommodated for in the design of certain types of devices which have a sufficient size to provide the necessary load path, in the field of portable communication devices where the trend is to produce smaller and smaller phone devices, the use of this type of hinge assembly can result in premature fatigue and structural failure of the mounting provisions for the hinge in the device housing and/or hinged member.

In another known hinge which was designed to address the axial loading problem, a preassembled hinge is provided which can hold a hinged member in an open position or a closed position. The hinge includes an outer shell which reacts the axial spring load such that no axial force is imparted on the device housing or the hinged member. However, this construction is bulky, and cannot be installed between the device housing and the hinged member with a simple manufacturing operation. Additionally, the hinged member is not held stably in the open position since the closing and opening forces of the hinge are the same. In the open position the spring force on the hinge which acts to maintain the hinge in the open position is lower than when the hinge is in the closed position and, accordingly, the hinged member is subject to movement or chatter while in the open position. This can cause premature wear of the hinge as well as to the device housing and the hinged member which are connected by the hinge.

The present invention provides a relatively inexpensive preassembled, self-contained, two position hinge which can hold a hinged member in a first, open position or a second, closed position relative to a device housing without imparting an axial load on the hinged member or the device housing thereby resulting in long operating life (over 50,000 cycles). The hinge of the present invention can be simply and easily connected to the hinged member and the device housing without tools and with mere finger pressure yielding reduced assembly cost of the final product. Additionally, it would be desirable to control the stability of the hinged member in the open position relative to the device housing. It would also be desirable to provide for over travel of the hinged member without structural damage to the hinged member, the device housing or the hinge itself.

SUMMARY OF THE INVENTION

Briefly stated, the present invention provides a hinge adapted to pivotably connect a hinged member to a device housing and which is adapted to maintain the hinged member in one of an open position and a closed position relative to the device housing. The hinge comprises a first hinge part having an axis and a cam follower. The first hinge part is adapted to be connected to one of the hinged member and the device housing. A second hinge part is provided which is aligned with and rotatable about the axis of the first hinge part. The second hinge part has a cam surface. The cam follower on the first hinge part contacts the cam surface. The cam surface has a first position and a second position. The second hinge part is adapted to be connected to the other of the hinged member and the device housing. A spring is provided which urges the cam follower against the cam surface with a spring force. The first and second hinge parts each have an axial bore defined therethrough. An axial load bearing connector extends through the axial bores to connect first and second hinge parts such that the spring generates forces that are reacted in the axial load bearing connector. The hinge is adapted to hold the hinged member in an open position relative to the device housing when the cam follower is in the first position.

In another aspect, the present invention provides a hinge which is adapted to pivotably connect a hinged member to a device housing and which is adapted to maintain the hinged member in one of an open position and a closed position relative to the device housing. The hinge includes a first hinge part having an axis and a cam follower. The first hinge part is adapted to be connected to one of the hinged member and the device housing. A second hinge part is provided which is aligned with and rotatable about the axis of the first hinge part. The second hinge part has a cam surface. The cam follower on the first hinge part contacts the cam surface. The cam surface has a first position and a second position. The second hinge part is adapted to be connected to the other of the hinged member and the device housing. A spring is provided which urges the cam follower against the cam surface with an axial spring force. An axial load bearing connector is provided which connects the first and second hinge parts in which the spring force is reacted. The hinge is adapted to hold the hinged member in an open position relative to the device housing when the cam follower is in the first position. A torque element is located between the first and second hinge parts. The torque element has a higher friction torque in a first rotational direction of the first hinge part relative to the second hinge part than in a second rotational direction of the first hinge part relative to the second hinge part, which is adapted to maintain the hinged member in a generally stable state in the first position.

In another aspect, the present invention provides a method of assembling a hinged member to a device housing. The method includes:

providing a preassembled hinge which includes a first hinge part with a first outer shape and a second hinge part with a second outer shape;

providing one of a hinged member and a device housing with a first bore located along a hinge axis, the first bore being complementary to and engagable by the first outer shape of the first hinge part;

providing the other of the hinged member and the device housing with a second bore located along the hinge axis which is complementary to and engagable by the second outer shape of the second hinge part, the second bore being of sufficient size to allow the first hinge part to pass therethrough;

aligning the hinged member and the device housing such that the first and second bores are axially aligned;

inserting the first hinge part through the second bore and into the first bore such that the first outer shape of the first hinge part engages in the first bore and the second outer shape of the second hinge part engages in the second bore.

In another aspect, the present invention provides a method of assembling a hinge. The method includes:

providing a pin having first and second ends, the first end including a head and the second end having a first diameter;

placing a first hinge part having an axial bore defined therethrough on the pin, the first hinge part including a cam follower;

placing a second hinge part having a second axial bore defined therethrough on the pin, the second hinge part being rotatable about an axis of the first hinge part, the second hinge part having a cam surface, the cam follower on the first hinge part contacting the cam surface, the second hinge part including a counter bore of a second diameter aligned with the axial bore on an opposite side from the cam surface such that the second end of the pin extends into the counter bore; and pressing a bushing simultaneously onto the second end of the pin and into the counter bore, the bushing having an inside diameter which is smaller than the first diameter, and an outer diameter which is smaller than the second diameter, the bushing expanding as it is pressed onto the pin creating an interference fit between the outer diameter and the bushing.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. The drawings are for the purpose of illustrating the present invention which is not limited to the devices and instrumentalities shown.

In the drawings:

FIG. 1 is a perspective view of a first preferred embodiment of a hinge in accordance with the present invention;

FIG. 2 is an exploded perspective view of the hinge shown in FIG. 1;

FIG. 3 is a perspective view of the hinge shown in FIG. 1 being installed in a foldable telephone device;

FIG. 4 is a cross-sectional view through the hinge shown in FIG. 1 taken along lines 4—4 in FIG. 1;

FIG. 10 is an exploded perspective view of a hinge in accordance with a third preferred embodiment of the invention similar to that shown in FIG. 7; and FIG. 11 is an exploded perspective view of a hinge in accordance with a fourth preferred embodiment of the invention similar to that shown in FIG. 7.

DETAILED DESCRIPTION OF THE INVENTION

Figure 6:
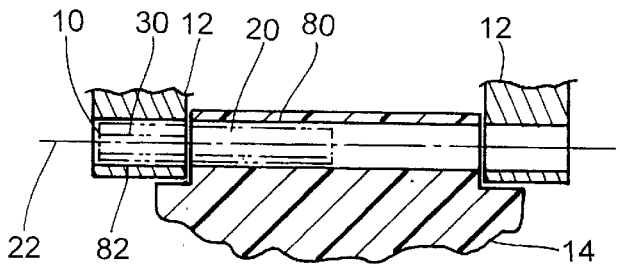
FIG. 6 is an enlarged partial cross-sectional view through the telephone device shown in FIG. 3 taken along lines 6—6 in FIG. 3 showing the opening for installing the hinge.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the hinges in accordance with the present invention and designated parts thereof. The terminology includes the words above specifically mentioned, derivatives thereof and words of similar import.

Referring now to FIGS. 1–3, there is shown a hinge 10 in accordance with a first preferred embodiment of the present invention. As shown in FIG. 3, the hinge 10 is adapted to connect a hinged member 12 to a device housing 14, for example on a cellular or radio telephone. The hinge 10 is adapted to maintain the hinged member 12 in one of an open position, as shown in FIG. 3, and a closed position (shown in phantom lines 12' in FIG. 3) relative to the device housing 14. For the device shown in FIG. 3, in the closed position the hinged member 12 is in facing engagement with the device housing 14.

As shown in FIGS. 1 and 2, the hinge 10 includes a first hinge part 20 having a longitudinal axis 22 and a cam follower 24. The first hinge part 20 is adapted to be connected to one of the hinged member 12 and the device housing 14, and is preferably adapted to be connected to the hinged member 12. Preferably, the first hinge part 20 includes a separate housing 23 in which the cam follower 24 is movably located, as explained in detail below. However, it will be recognized by those skilled in the art from the present disclosure that the first hinge part 20 can be formed as a unitary piece with the cam follower 24, as will be explained in connection with the second embodiment of the invention described in detail below.

The hinge 10 also includes a second hinge part 30 which is aligned with and rotatable about the axis 22 of the first hinge part 20. The second hinge part 30 includes a cam surface 32 on an end surface thereof. The cam follower 24 of the first hinge part 20 contacts the cam surface 32, as shown in FIG. 1. In a preferred embodiment, the second hinge part 30 includes two cam surfaces 32a, 32b, shown most clearly in FIGS. 2 and 5. Each cam surface 32a, 32b includes a first position 34 and a second position 36. However, it will be recognized by those skilled in the art from the present disclosure that only a single cam surface 32 is required, and that if an opening angle of approximately 180° or more is desired, only a single cam surface 32 and cam follower contact can be used.

A spring 40 is provided which urges the cam follower 24 against the cam surface 32 with a spring force, as described in more detail hereinafter. The spring 40 is seated against an end surface 23a of the housing 23. Preferably, the spring 40 is a compression coil spring. However, other types of springs, such as disc springs or any other suitable spring may be used, if desired.

As shown in FIG. 2, preferably the cam follower 24 includes two contacts 26, 28 for following each cam surface 32a, 32b, respectively. The housing 23 of the first hinge part 20 includes an axially disposed chamber 42 defined therein. The spring 40 is located in the chamber 42, and the cam follower 24 is also slidably located in the chamber 42 in contact with the spring 40 such that the spring 40 applies the spring force on the cam follower 24 toward the cam surface 32 while allowing the cam follower 24 to move axially in the first hinge part 20.

Preferably, the housing 23 includes an axial guide structure 44, as shown in FIG. 4, and the cam follower 24 includes a complementary axial alignment structure 46, such that the cam follower 24 is restrained from rotational movement relative to the housing 23 of the first hinged part 20 but is allowed to reciprocate within the housing 23. Preferably, the axial alignment structure 46 on the cam follower 24 takes the form of protrusions which extend radially from opposite sides of the cam follower 24 which are received in axially extending grooves in the housing 23 of the first hinge part 20 which form the axial guide structure 44.

As shown in FIGS. 2 and 4, the first and second hinge parts 20, 30 each have an axial bore 48, 50, respectively, defined therethrough. Preferably, the cam follower 24 also includes an axial bore 52 defined therethrough as shown in detail in FIGS. 2 and 4. An axial load bearing connector 60 extends through the axial bores 48, 50, 52 to connect the first and second hinge parts 20, 30 together. The force of the spring 40 is reacted in the axial load bearing connector 60 such that no axial load is imparted by the hinge assembly 10 to the hinged member 12 or device housing 14 after it is assembled with the device.

Figure 5:
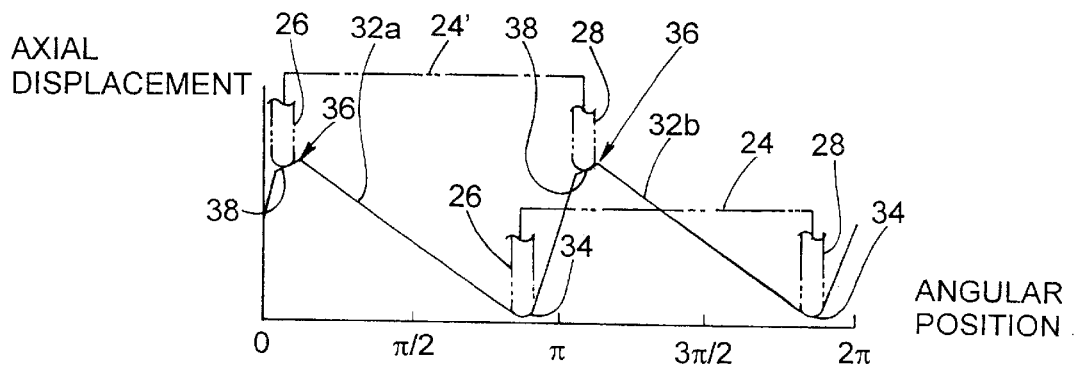
FIG. 5 is a graph showing the change in axial displacement of the cam surface with respect to angular position for the hinge in accordance with the first preferred embodiment of the invention shown in FIG. 1.

Referring now to FIG. 5, a graph showing the change in axial displacement of the cam surfaces 32a, 32b with respect to angular position about the axis 22 is provided. For the purposes of illustration, both contacts 26, 28 of the cam follower 24 have been shown displaced 180° from each other. In an open position, the contacts 26, 28 of the cam follower 24 are in the first position 34 of the respective cam surfaces 32a, 32b. The spring 40 applies less force on the cam follower 24 in the first position 34 than when the cam follower 24 is in the second position 36 since it is not as compressed. The second position 36 is an uppermost position on cam profiles 32a, 32b. The cam surfaces 32a, 32b also include a third, intermediate position 38 which is axially offset from the first and second positions 34, 36. The intermediate position 38 preferably comprises a short shelf which is offset slightly from the second, uppermost position 36 and is adapted to hold the hinged member 12 in a closed position relative to the device housing 14 when the cam follower 24 moves from the first position 34, past the second position 36 where the maximum spring force must be overcome, and to the third position 38, as represented by 24' in FIG. 5. The cam follower 24 must always move past the uppermost positions 36 on cam profiles 32a, 32b to move the hinged member 12 to or from the closed position 38. In the closed position, the hinged member 12 bears on the device housing 14 to prevent further movement.

As best shown in FIG. 2, the axial load bearing connector 60 is preferably in the form of a pin 61 which includes first and second ends. A head 62 is located on the first end. One of the first and second hinge parts 20, 30, and preferably the second hinge part 30, is connected to the second end. A torque element 64 is located on the pin 61 and connected to the other of the first and second hinge parts 20, 30, and preferably to the first hinge part 20, via an extension 66 on the torque element 64 being engaged in a slot 68 on the first hinge part 20. The torque element 64 has a higher friction torque in a first rotational direction of the pin 61 than in a second rotational direction of the pin 61. This means that a higher torque is required to rotate the first hinge part 20 relative to the second hinge part 30 as the first hinged part 20 is rotated in a first, closing direction (namely clockwise in FIGS. 1–3) relative to the second hinge part 30 and requires less torque to rotate the first hinge part 20 in a second, opening direction (counter clockwise in FIGS. 1–3) relative to the second hinge part 30. The use of the torque element 64 between the first and second hinge parts 20, 30 is used to maintain the hinged member 12 in a stable state in the first, open position since the hinge 10 is oriented such that a higher torque is required to initially close the hinged member 12 from the open position relative to the device housing 14 than is required to open the hinged member 12 from the closed position.

The torque element 64 is preferably of the type which is constructed of substantially uniform strength described in applicant's U.S. Pat. No. 5,491,874, which is incorporated herein by reference as if fully set forth. However, it will be recognized by those skilled in the art from the present disclosure that other types of torque elements can be used, if desired, such as torque elements which do not have uniform strength.

Still with reference to FIG. 2, the connection between the pin 61 and the second hinge part 30 is preferably accomplished with a press fit bushing 70. The press fit bushing 70 has an inside diameter which is slightly smaller than the outside diameter of the pin 61 and an outside diameter which is slightly smaller than the inside diameter of a bushing receiving bore 72 located in the second hinge part 30. After all of the elements of the hinge 10 are assembled on the pin 61, as shown in FIG. 2, the press fit bushing 70 is pressed onto the second end of the pin 61 at the same time as it is pressed into the bore 72 in the second hinge part 30. As the bushing 70 expands over the second end of the pin 61, it contacts the inside diameter of the bore 72 forming the connection between the second end of the pin 61 and the second hinge part 30, such that the pin 61 is firmly connected to and rotates with the second hinge part 30 during movement relative to the first hinge part 20. However, it will be recognized by those skilled in the art from the present disclosure that other types of connections, such as welding or mechanical deformation of the second end of the pin 61 or any other suitable connecting means may be used to connect the second end of the pin 61 to the second hinge part 30. Alternatively, the pin 61 can be formed as part of the second hinge part 30, and the head 62 can be formed on the first end after assembly of the hinge elements on the pin 61.

Referring now to FIGS. 1, 3 and 6, the hinge 10 is assembled with the hinged member 12 and the device housing 14 using a simple assembly operation. As shown in FIG. 1, preferably, the first hinge part 20 of the hinge 10 includes a first outer shape 76 and the second hinge part 30 includes a second outer shape 78. As shown in FIG. 6, one of the hinged member 12 and the device housing 14, and preferably the device housing 14, is provided with a first bore 80 located along the hinge axis 22. The first bore 80 is complementary to and engagable by the first outer shape 76 of the first hinge part 20. The other of the hinged member 12 and the device housing 14, and preferably the hinged member 12, is provided with a second bore 82 located along the hinge axis 22 which is complementary to and engagable by the second outer shape 78 of the second hinge part 30. The second bore 82 is of sufficient size to allow the first hinge part 20 to pass therethrough. After aligning the hinged member 12 and the device housing 14 such that the first and second bores are axially aligned, the hinge 10 is inserted from outside of the hinged member 12 and device housing 14, with the first hinge part 20 passing through the second bore 82 and into the first bore 80 such that the first outer shape 76 of the first hinge part 20 engages in the first bore 80. The second outer shape 78 of the second hinge part 30 is engaged in the second bore 82 as the hinge 10 is pressed into position, as shown in FIG. 6. This operation allows for simple and efficient assembly of hinged member 12 to a device housing 14. A pivotable connection (not shown) can be provided on the opposite side of the device housing 14 from the hinge 10 of the present invention in order to provide a more stable hinged connection.

Preferably, the first and second hinge parts 20, 30, are provided with an outside generally frusto-conical taper extending from the second hinge part 30 to the first hinge part 20 and a plurality of radially outwardly extending ribs which engage in the complementarily configured bores 80, 82 in the device housing 14 and hinged member 12, respectively. The axially extending ribs, best shown in FIG. 4, grip the bores and provide a firm connection between the first hinge part 20 and the device housing 14 and the second hinge part 30 and the hinged member 12.

The hinge 10 in accordance with the present invention can be used in connection with a cellular telephone housing with the hinged member 12 being one of a microphone or speaker holding member which is pivotably connected to the cellular telephone housing 14, such as shown in FIG. 3.

In order to assemble the hinge 10, the first hinge part 20 is placed on the pin 61. Preferably, a washer 65 and the torque element 64 are installed on the pin 61 prior to the first hinge part 20 being installed on the pin 61. The first hinge part 20 includes the housing 23 in which the spring 40 and cam follower 24 are nested. The second hinge part 30 is placed over the pin 61 such that the second hinge part 30 is rotatable about the axis 22 of the first hinge part with the cam surface 32 contacting the cam follower 24. The press fit bushing 70 is then pressed over the second end of the pin 61 and into the bushing receiving bore 72.

Figure 8:
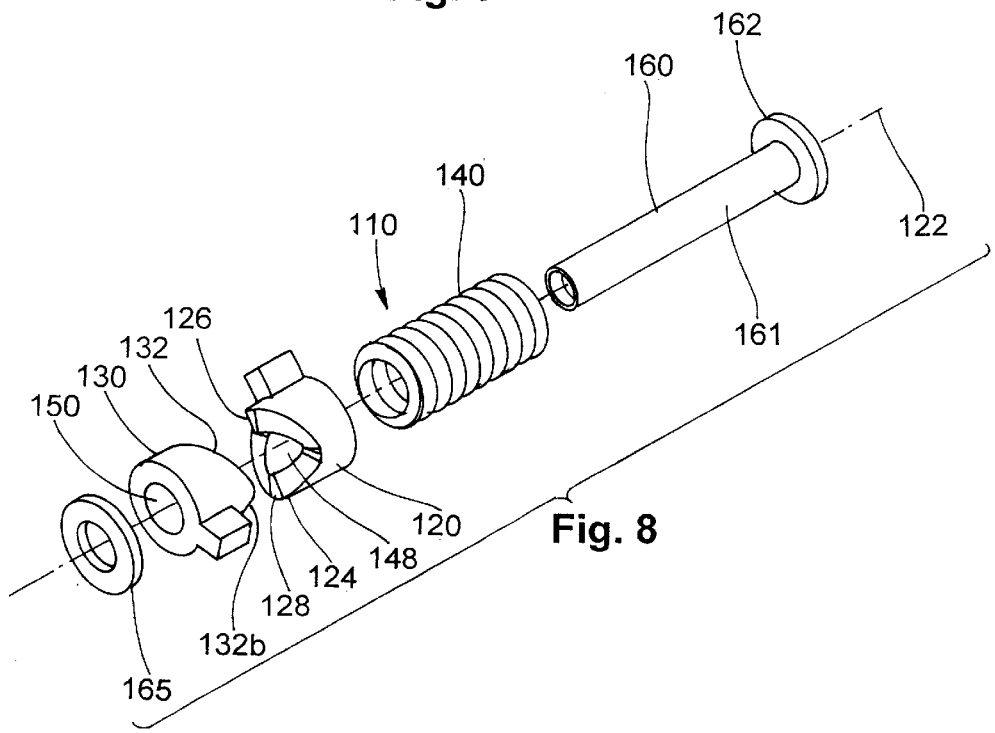
FIG. 8 is an exploded perspective view of the hinge in accordance with the second preferred embodiment of the invention show in FIG. 7.
Figure 7:
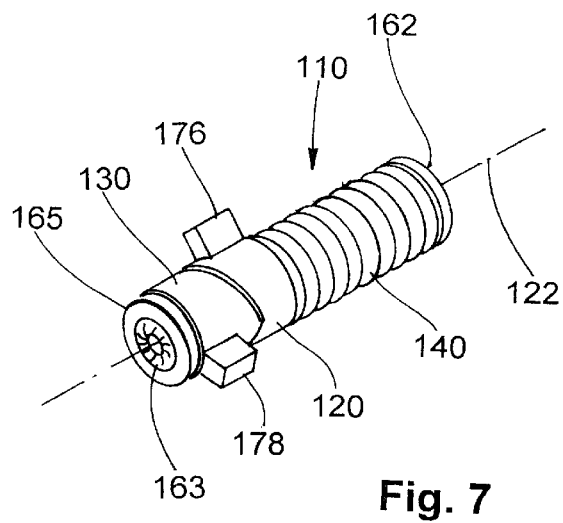
FIG. 7 is a perspective view showing a second preferred embodiment of a hinge in accordance with the present invention.
Figure 9:
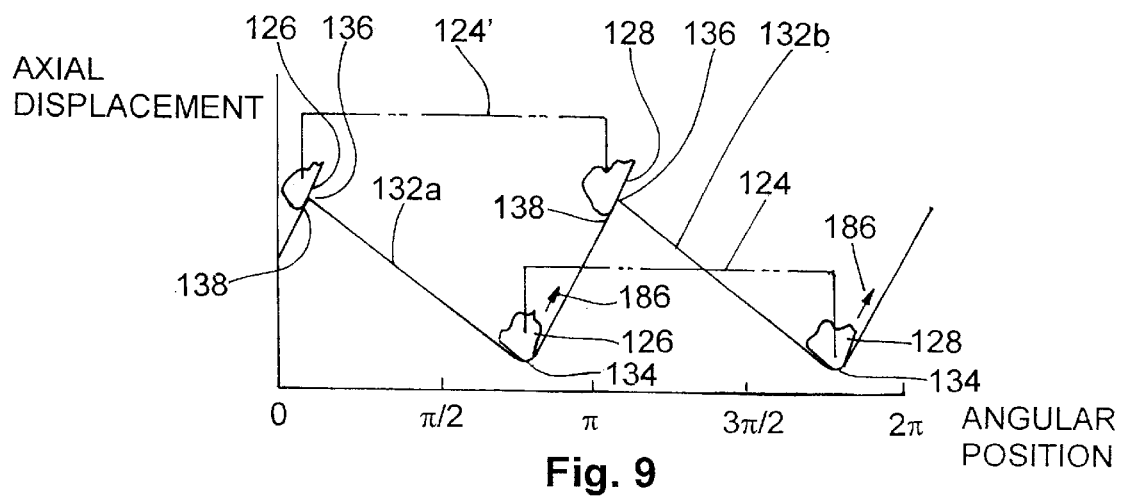
FIG. 9 is a graph showing the axial displacement of the cam surface with respect to angular position for the second preferred embodiment of the hinge shown in FIG. 7.

Referring now to FIGS. 7–9, a second embodiment of a hinge 110 in accordance with the present invention is shown. The hinge 110 operates on a similar principle to the hinge 10 and includes a first hinge part 120 with a cam follower 124 having contacts 126 and 128 and a second hinge part 130 which includes a cam surface 132. In the second preferred embodiment, the first and second hinge parts 120, 130 are identical, with each including a shaped, circumferentially extending surface on one end face. The circumferentially extending surfaces are matingly engaged with each other by the first hinge part 120 being displaced about axis 122 relative to the second hinge part 130 in a first position. The cam follower 124 on the first hinge part 120 presses against a portion of the cam surface 132 on the second hinge part 130. Preferably, contacts 126, 128 on the first hinge part 120 bear on cam surfaces 132*a*, 132*b* on the second hinge part 130.

As shown in detail in FIG. 8, a pin 161 having a first end with a head 162 is provided. The pin 161 acts as an axial load bearing connector, and is inserted through a compression coil spring 140 and axially extending bores 148, 150 in the first and second hinge parts 120, 130, respectively. A washer 165 is placed over the second end of the pin 161, and the second end of the pin 161 is crimped over, as shown in FIG. 7, to form the hinge assembly 110.

The first and second hinge parts 120, 130, each include a projection 176, 178, which allow the first and second hinge parts 120, 130 to be connected to a hinged member and a device housing (not shown). One of the hinged member and the device housing in which the hinge 110 is to be used must include a slot to allow one of the projections 176, 178 to be axially displaced as the hinge is opened and closed. Alternatively, an outer housing (similar to the housing 23 of the first embodiment) can be provided which includes an axial channel in which one of the projections 176 or 178 can slide. The outside of such housing would be anchored in one of the hinged member and the device housing (not shown) in order to prevent wear.

Referring to FIG. 9, a graph showing the change in axial displacement of the cam surfaces 132*a*, 132*b* based on angular position about the axis 122 is provided. In a first position 134, the contacts 126, 128 of the cam follower 124 are located at a lowermost position that corresponds to an open position of the hinge 110, in which a hinged member (not shown) would be open relative to a device housing (not shown). The hinged member can be moved to a closed position, represented by the cam follower 124' with the contacts 126, 128 having passed over a second, uppermost position 136 on the cam surfaces 132*a*, 132*b* and dropping down to a third, intermediate position 138. The physical position of the hinged member and device housing in the closed portion prevents the contacts 126, 128 from traveling beyond the third, intermediate position. In order to open the hinge 110, an initial force to compress the spring must be overcome prior to the spring 140 expanding and urging the hinge 110 to the open position.

In the second embodiment of the hinge 110, the cam follower 124 can over travel in the direction of arrow 186 from the first position 134 by moving up the transition slopes between the first and second cam surfaces 132*a*, 132*b*. While the transition slopes are relatively steep in comparison to the cam surfaces 132*a*, 132*b*, they do permit overextension of the first and second hinge parts 120, 130 against the force of the spring 140 which acts to return the first hinge part 120 to the first position relative to the second hinge part 130, as represented by 134.

Preferably, the bores 148, 150 in the first and second hinge parts 120, 130 are sized to provide a slip fit on the pin 161. This allows partial use of the torsional force of the spring 140 to assist in opening a hinged member (not shown) based on the friction generated between the end face of the spring 140 acting on the abutting face of the first hinged part 120. The torsional force would be proportional to the compressive force being exerted by the spring 140.

Referring now to FIG. 10, a third preferred embodiment of the invention 210 is shown. The elements of the hinge 210 are similar to the elements of the hinge 110 in accordance with the second embodiment, as described above, and like elements have been identified with like reference numerals with the prefix "2" in place of the prefix "1". For example, the first hinge part 120 of the second preferred embodiment is similar to the first hinge part 220 in the third preferred embodiment. Accordingly, a detailed description of these similar elements has been omitted for the sake of brevity, and the differences between the hinges in accordance with the second and third embodiments of the invention 110, 210 are described in detail below.

In the third preferred embodiment, a tab 263 is provided on the head 262 of the axial connector pin 261. The tab 263 is adapted to be positioned in the same slot in the housing or hinged member as the projection 276. This prevents rotation of the pin 261 relative to the first hinged part 220 in order to eliminate any torsional force which could be applied by the spring 240 to the first hinged member 220.

Referring now to FIG. 11, a fourth preferred embodiment of the invention 310 is shown. The elements of the hinge 310 are similar to the elements of the hinge 110 in accordance with the second embodiment, as described above, and like elements have been identified with like reference numerals with the prefix "3" in place of the prefix "1". For example, the first hinge part 120 of the second preferred embodiment is similar to the first hinge part 320 in the fourth preferred embodiment. Accordingly, a detailed description of these similar elements has been omitted for the sake of brevity, and the differences between the hinges in accordance with the second and fourth embodiments of the invention 110, 310 are described in detail below.

As shown in FIG. 11, in the fourth preferred embodiment of the invention, the spring 340 includes a projection 341, 343 at each end in order to allow torsional loading and unloading of the spring 340. The projection 341 at the first end of the spring 340 is aligned with and is located in the same slot in the housing or hinged member as the projection 376 of the first hinge part 320. The projection 343 on the second end of the spring 340 is received in a recess 365 of the head 362 of the pin 361. The bore 350 in the second hinge part 330 is sized for a press fit onto the pin 361.

As the second hinge part 330 and an associated hinged member (not shown) are moved relative to the first hinge part 320 located in an associated housing (not shown) toward the closed position, the spring 340 is compressed and loaded torsionally. This provides a minimum holding force in the closed position of the hinge 310 since the torsion force acts in the opening direction against the compression force which acts to maintain the contacts 326, 328 in the third, intermediate position. Upon opening of the hinge 310, as soon as the compressive force of the spring 340 is overcome to move the contacts 326, 328 past the second, uppermost position, the torsional force of the spring 340 combines with the unloading of the compressive force to provide maximum assistance for opening the hinged member attached to the second hinge part 340 relative to the housing attached to the first hinge part 320.

In the preferred embodiments 10, 110, 210, 310, the hinged member is preferably held in an open position between 130° and 160° relative to the device housing. This is especially useful for radio or cellular phones. However, it will be recognized by those skilled in the art from the present disclosure that the angular opening displacement can be designed to be at any desired angle, and the present invention is not limited to a particular opening angle.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A hinge adapted to pivotably connect a hinged member to a device housing and being adapted to maintain the hinged member in one of an open position and a closed position relative to the device housing, the hinge comprising:

a first hinge part having an axis and a cam follower, the first hinge part being adapted to be connected to one of the hinged member and the device housing;

a second hinge part aligned with and rotatable about the axis of the first hinge part, the second hinge part having a non-planar cam surface, the cam follower on the first hinge part contacting the cam surface in non-planar mating engagement for movement of the cam follower axially with respect to the cam surface, the cam surface having a first axial position and a second axial position, the second hinge part being adapted to be connected to the other of the hinged member and the device housing;

a spring which urges the cam follower against the cam surface with a spring force;

the spring applies less force on the cam follower when the cam follower is engaging the first axial position on the cam surface than when the cam follower is engaging the second axial position of the cam surface;

the cam surface includes a third intermediate axial position which is offset axially from the first and second axial positions, the hinge being adapted to hold the hinged member in a closed position relative to the device housing when the cam follower moves from the first axial position past the second axial position to the third axial position such that a maximum spring force must be overcome to move the hinged member to or from the first axial position;

the first and second hinge parts each have an axial bore defined therethrough; and an axial load bearing connector extends through the axial bores to connect the first and second hinge parts such that the forces generated by the spring are reacted in the axial load bearing connector, the connector having first and second ends to secure the first and second hinge parts and spring therebetween, wherein the hinge is adapted to hold the hinged member in an open position relative to the device housing when the cam follower is engaging the first axial position of the cam surface.

2. The hinge of claim 1 wherein the first hinge part includes a housing having an axially disposed chamber defined therein, the spring is located in the chamber and the cam follower is slidably located in the chamber in contact with the spring such that the spring force is applied on the cam follower.

3. The hinge of claim 2 wherein the housing includes an axial alignment structure and the cam follower includes a complementary axial alignment structure such that the cam follower is restrained from rotational movement relative to the housing.

4. The hinge of claim 3 wherein the housing includes an axial bore defined therethrough, the cam follower includes a axial bore defined therethrough, and the axial load bearing connector extends through the axial bores of the second hinge part, the cam follower, and the housing.

5. The hinge of claim 4 wherein the axial load bearing connector is a pin which includes first and second ends, a head is located on the first end, and one of the first and second hinge parts is connected to the second end.

6. The hinge of claim 5 further comprising a torque element located on the pin and connected to the other of the first and second hinge parts to which the second end of the pin is connected, the torque element has a higher friction torque in a first rotational direction of the pin than in a second rotational direction of the pin.

7. The hinge of claim 6 wherein the pin is connected to the second hinge part with a press fit bushing.

8. The hinge of claim 1 further including a torque element extending between the first and second hinge parts which imparts a higher friction torque in a first relative rotational direction between the first and second hinge parts than in a second rotational direction between the first and second hinge parts.

9. The hinge of claim 1 wherein the first and second hinge parts are identical, each including a circumferentially extending surface, with the circumferentially extending surfaces being matingly engaged with each other by the first hinge part being rotationally displaced about the axis relative to the second hinge part in the first position, the cam follower comprising a portion of the surface on the first hinge part, and the cam surface comprising a portion of the surface on the second hinge part.

10. The hinge of claim 1 wherein the spring applies a torsional force on the first hinge part.

11. A hinge adapted to pivotably connect a hinged member to a device housing and being adapted to maintain the hinged member in one of an open position and a closed position relative to the device housing, the hinge comprising:

a first hinge part having an axis and a cam follower, the first hinge part being adapted to be connected to one of the hinged member and the device housing;

a second hinge part aligned with and rotatable about the axis of the first hinge part, the second hinge part having a non-planar cam surface, the cam follower on the first hinge part contacting the cam surface in non-planar mating engagement for movement of the cam follower axially with respect to the cam surface, the cam surface having a first axial position and a second axial position, the second hinge part being adapted to be connected to the other of the hinged member and the device housing;

a spring which urges the cam follower against the cam surface with a spring force;

an axial load bearing connector which connects the first and second hinge parts in which spring force is reacted, the connector having first and second ends to secure the first and second hinge parts and spring therebetween, wherein the hinge is adapted to hold the hinged member in an open position relative to the device housing when the cam follower is engaging the first axial position of the cam surface; and a torque element located between the first and second hinge parts, the torque element having a higher friction torque in a first rotational direction of the first hinge part relative to the second hinge part than in a second rotational direction of the first hinge part relative to the second hinge part which is adapted to maintain the hinged member in a stable state in the first position.

12. A method of assembling a hinged member to a device housing, comprising:

(a) providing a preassembled hinge which includes a first hinge part with a first outer shape and a second hinge part with a second outer shape;

(b) providing one of a hinged member and a device housing with a first bore located along a hinge axis, the first bore being complementary to and engagable by the first outer shape of the first hinge part;

(c) providing the other of the hinged member and the device housing with a second bore located along the hinge axis which is complementary to and engagable by the second outer shape of the second hinge part, the second bore being of sufficient size to allow the first hinge part to pass therethrough;

(d) aligning the hinged member and the device housing such that the first and second bores are axially aligned;

(e) inserting the first hinge part through the second bore and into the first bore inwardly from outside the device housing such that the first outer shape of the first hinge part engages in the first bore and the second outer shape of the second hinge part engages in the second bore.

13. The method of claim 12 wherein the hinge is pressed into the first and second bores.

14. The method of claim 12 wherein the first and second hinge parts are provided with a taper, and the first and second bores are provided with a complementary taper.

15. The method of claim 12 wherein the device housing is a cellular telephone housing, and the hinged member is one of a microphone and a speaker holding member which is pivotally connected to the cellular telephone housing.

16. A method of assembling a hinge, comprising:

(a) providing a pin having first and second ends, the first end including a head and the second end having a first diameter;

(b) placing a first hinge part having an axial bore defined therethrough on the pin, the first hinge part including a cam follower;

(c) placing a second hinge part having a second axial bore defined therethrough on the pin, the second hinge part rotatable about an axis of the first hinge part, the second hinge part having a cam surface, the cam follower on the first hinge part contacting the cam surface, the second hinge part including a counter bore of a second diameter aligned with the axial bore on an opposite side from the cam surface such that the second end of the pin extends into the counter bore; and (d) pressing a bushing simultaneously onto the second end of the pin and into the counter bore, the bushing having an inside diameter which is smaller than the first diameter, and an outer diameter which is smaller than the second diameter, the bushing expanding as it is pressed onto the pin creating an interference fit between the second diameter and the bushing.

* * * * *

UNITED STATES PATENT AND TRADEMARK OFFICE
CERTIFICATE OF CORRECTION

PATENT NO.        : 6,141,831
APPLICATION NO.   : 09/207544
DATED             : November 7, 2000
INVENTOR(S)       : Eugene Novin et al.

It is certified that error appears in the above-identified patent and that said Letters Patent is hereby corrected as shown below:

On the Title Page, Item (60), the provisional application serial number "60/097,989": is changed to --60/067,989--.

Signed and Sealed this

Thirty-first Day of March, 2009

JOHN DOLL
*Acting Director of the United States Patent and Trademark Office*